(12) United States Patent
Teraya

(10) Patent No.: US 10,704,481 B2
(45) Date of Patent: Jul. 7, 2020

(54) CONTROLLER AND CONTROL METHOD FOR INTERNAL COMBUSTION ENGINE

(71) Applicant: TOYOTA JIDOSHA KABUSHIKI KAISHA, Toyota-shi, Aichi-ken (JP)

(72) Inventor: Ryuta Teraya, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/156,388

(22) Filed: Oct. 10, 2018

(65) Prior Publication Data

US 2019/0120154 A1 Apr. 25, 2019

(30) Foreign Application Priority Data

Oct. 19, 2017 (JP) .................. 2017-202793

(51) Int. Cl.
| | |
|---|---|
| *F02M 25/06* | (2016.01) |
| *F02D 41/00* | (2006.01) |
| *F02M 26/15* | (2016.01) |
| *F02M 26/47* | (2016.01) |
| *F01N 3/021* | (2006.01) |
| *F02D 41/02* | (2006.01) |

(52) U.S. Cl.
CPC ......... *F02D 41/0077* (2013.01); *F01N 3/021* (2013.01); *F02D 41/0055* (2013.01); *F02D 41/0235* (2013.01); *F02M 26/15* (2016.02); *F02M 26/47* (2016.02); *F02D 41/029* (2013.01); *F02D 2200/08* (2013.01); *F02D 2200/0812* (2013.01)

(58) Field of Classification Search
CPC ......... F02M 26/15; F02M 26/47; F01N 3/021

USPC ........................................................... 60/278
See application file for complete search history.

(56) References Cited

U.S. PATENT DOCUMENTS

| | | | |
|---|---|---|---|
| 6,981,369 B2 * | 1/2006 | Miura | F02D 41/0002 60/274 |
| 8,137,434 B2 * | 3/2012 | Yahata | F02D 9/02 55/385.3 |
| 2004/0128987 A1 | 7/2004 | Kuboshima et al. | |
| 2005/0044846 A1 * | 3/2005 | Yahata | B01D 46/0086 60/295 |
| 2006/0016179 A1 * | 1/2006 | Okugawa | F01N 9/002 60/297 |

(Continued)

FOREIGN PATENT DOCUMENTS

| | | |
|---|---|---|
| DE | 102008055189 A1 | 7/2009 |
| JP | 2003-161179 A | 6/2003 |
| JP | 2009-036183 | 2/2009 |

*Primary Examiner* — Jason D Shanske
(74) *Attorney, Agent, or Firm* — Finnegan, Henderson, Farabow, Garrett & Dunner, LLP

(57) ABSTRACT

An internal combustion engine includes a filter, which is configured to trap particulate matter in exhaust gas, an EGR passage, which connects a section of an exhaust passage that is upstream of the filter to an intake passage, and an EGR valve, which is configured to adjust a cross-sectional flow area of the EGR passage. A controller for the internal combustion engine includes processing circuitry, which is configured to execute a limiting process of limiting an opening degree of the EGR valve such that the opening degree is likely to decrease when an amount of the particulate matter trapped by the filter is great as compared to when the amount is small.

7 Claims, 6 Drawing Sheets

(56) References Cited

U.S. PATENT DOCUMENTS

2009/0178390 A1 7/2009 Yahata et al.
2014/0331643 A1 11/2014 Reich et al.

\* cited by examiner

CONTROLLER AND CONTROL METHOD FOR INTERNAL COMBUSTION ENGINE

BACKGROUND

The present disclosure relates to a controller adapted for an internal combustion engine that includes a filter that traps particulate matter in exhaust gas, an EGR passage that connects the upstream side of the filter in the exhaust passage to the intake passage, and an EGR valve that adjusts the cross-sectional flow area of the EGR passage.

For example, Japanese Laid-Open Patent Publication No. 2009-36183 discloses an internal combustion engine that includes a filter that traps particulate matter in exhaust gas, an EGR passage that connects the exhaust passage and the intake passage to each other, and an EGR valve that adjusts the cross-sectional flow area of the EGR passage.

If the amount of particulate matter trapped by the filter increases, the pressure on the upstream side of the filter may become excessively higher than the pressure on the downstream side. When the pressure on the upstream side of the filter is excessively high, the pressure on the upstream side of the EGR valve becomes excessively higher than the pressure on the downstream side. This causes a great amount of exhaust gas for the opening degree of the EGR valve to flow into the intake passage, which may reduce the controllability of the internal combustion engine.

SUMMARY

Examples of the present disclosure will now be described.

EXAMPLE 1

A controller for an internal combustion engine is provided. The internal combustion engine includes a filter, which is configured to trap particulate matter in exhaust gas, an EGR passage, which connects a section of an exhaust passage that is upstream of the filter to an intake passage, and an EGR valve, which is configured to adjust a cross-sectional flow area of the EGR passage. The controller comprises processing circuitry, which is configured to execute a limiting process of limiting an opening degree of the EGR valve such that the opening degree is likely to decrease when an amount of the particulate matter trapped by the filter is great as compared to when the amount is small.

When the amount of particulate matter trapped in the filter is great, the pressure in the exhaust passage on the upstream side of the filter is higher than in the case in which the amount is small. Thus, due to the fact that the pressure on the upstream side of the EGR valve becomes higher than the pressure on the downstream side as compared with the case in which the pressure on the upstream side of the filter is not increased, the flow rate of exhaust gas flowing into the intake passage from the EGR passage becomes great for the opening degree of the EGR valve. Accordingly, in the above configuration, when the amount of particulate matter trapped in the filter is great, the limiting process limits the opening degree of the EGR valve such that the opening degree is likely to decrease, so that the flow rate of exhaust gas flowing into the intake passage is likely to decrease. This prevents the flow rate of exhaust gas flowing into the intake passage from the EGR passage from becoming excessively great.

EXAMPLE 2

In the controller of Example 1, the processing circuitry is configured to execute an EGR control process of operating the opening degree of the EGR valve in accordance with an operating point of the internal combustion engine, thereby adjusting a flow rate of exhaust gas flowing into the intake passage from the EGR passage through an open-loop control.

In the above configuration, the opening degree of the EGR valve, which is the operation amount of the open-loop control, is set in accordance with the operating point of the internal combustion engine. When the operating point of the internal combustion engine is determined, the approximate value of the pressure in the intake passage is determined. Therefore, if the amount of particulate matter trapped in the filter is small, the approximate value of the differential pressure, which is obtained by subtracting the pressure in the intake passage from the pressure in the exhaust passage on the upstream side of the filter is also determined. However, when the amount of particulate matter trapped in the filter increases, the actual differential pressure greatly deviates from the value assumed in setting of the operation amount. Thus, if the opening degree of the EGR valve is set in accordance with the operating point of the internal combustion engine, the amount of exhaust gas that flows into the intake passage from the EGR passage may become greater than assumed. Therefore, in the open-loop control as described above, the control process is particularly of great utility value.

EXAMPLE 3

In the controller of Example 1 or Example 2, the limiting process includes a process of limiting the opening degree of the EGR valve such that the opening degree is more likely to decrease when a differential pressure that is obtained by subtracting a pressure in a section of the exhaust passage that is downstream of the filter from a pressure in the section of the exhaust passage that is upstream of the filter is great than when the differential pressure is small.

The flow rate of exhaust gas flowing into the intake passage from the EGR passage becomes high for the opening degree of the EGR valve due to increase in the amount of particulate matter trapped by the filter. The degree of such increase in the exhaust flow rate correlates more strongly with the differential pressure than with the amount of trapped particulate matter. Therefore, by using the differential pressure, the opening degree of the EGR valve can be more adequately limited.

EXAMPLE 4

In the controller of Example 3, the limiting process includes a process of limiting, on condition that the differential pressure is greater than a threshold value, the opening degree of the EGR valve to a limited opening degree, which is greater than zero and smaller than that in a case in which the differential pressure is smaller than or equal to the threshold value, in at least part of a region of the operating point of the internal combustion engine.

In the above configuration, the limiting process permits a value greater than zero as the opening degree of the EGR valve. Thus, compared with the case in which the opening degree is zero, exhaust gas flowing into the intake passage from the EGR passage fills the combustion chamber. This suppresses increase in the fuel consumption amount.

EXAMPLE 5

In the controller of Example 4, the limited opening degree is a first limited opening degree, and the threshold value is a first threshold value. The limiting process includes: a process of limiting the opening degree of the EGR valve to the first limited opening degree in the at least part of the region of the operating point when the differential pressure is greater than the first threshold value and smaller than or equal to a second threshold value, which is greater than the first threshold value; and a process of limiting, on condition that the differential pressure is greater than the second threshold value, the opening degree of the EGR valve to a second limited opening degree, which is greater than zero and smaller than the first limited opening degree, in the at least part of the region of the operating point.

In the above configuration, on condition that the differential pressure is greater than the second threshold value, the process of limiting the opening degree of the EGR valve to the second limited opening degree is executed. Thus, compared with a case in which this process is not executed, the first limited opening degree can be maximized, and the differential pressure causing the necessity to limit the opening degree of the EGR valve to zero can be maximized.

EXAMPLE 6

In the controller of Example 4, the limiting process includes a process of limiting the opening degree of the EGR valve to zero when the differential pressure is greater than a predetermined value that is greater than the threshold value.

The above configuration includes the process of limiting the opening degree of the EGR valve to zero when the differential pressure is greater than the predetermined value. It is thus unnecessary to set the limit opening degree in consideration of the case in which the differential pressure is greater than the predetermined value. For this reason, the limit opening degree can be maximized as compared with the case in which the process of limiting the opening degree to zero.

EXAMPLE 7

In the controller of any one of Examples 4 to 6, the limiting process includes a process of limiting, on condition that an intake air amount is smaller than a predetermined amount even if the differential pressure is smaller than the threshold value, the opening degree of the EGR valve to the limited opening degree in the at least part of the region of the operating point.

When the intake air amount is small, the amount of change in differential pressure in accordance with the amount of particulate matter trapped in the filter is small. For this reason, it is difficult to accurately determine whether to limit the opening degree of the EGR valve in accordance with the differential pressure. However, even when the intake air amount is small, if the amount of particulate matter trapped in the filter increases to a certain extent, the flow rate of exhaust gas flowing into the intake passage from the EGR passage becomes great for the opening degree of the EGR valve as compared with a case in which the amount of trapped particulate matter is small. For this reason, the opening degree of the EGR valve is limited to the limited opening degree on condition that the intake air amount is smaller than the predetermined amount.

Other aspects and advantages of the present disclosure will become apparent from the following description, taken in conjunction with the accompanying drawings, illustrating exemplary embodiments.

BRIEF DESCRIPTION OF THE DRAWINGS

The disclosure may be understood by reference to the following description together with the accompanying drawings.

DETAILED DESCRIPTION

A controller for an internal combustion engine according to one embodiment will now be described with reference to the drawings.

Figure 1:
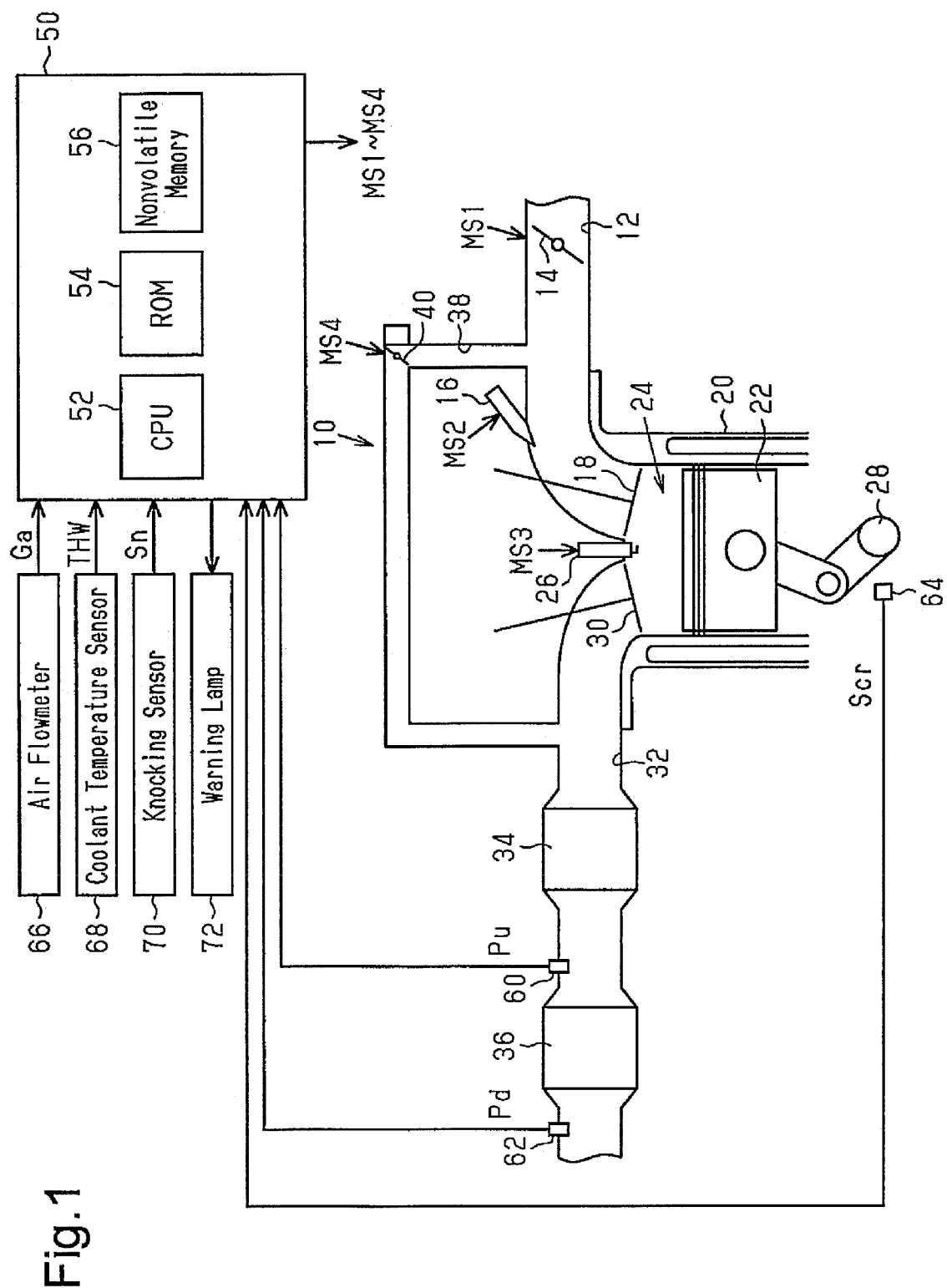
FIG. 1 is a diagram of an internal combustion engine and a controller according to one embodiment.

As shown in FIG. 1, the internal combustion engine 10 includes a throttle valve 14 arranged in an intake passage 12 and a fuel injection valve 16 arranged downstream of the throttle valve 14. Air drawn into the intake passage 12 and fuel injected from the fuel injection valve 16 flow into a combustion chamber 24, which is defined by a cylinder 20 and a piston 22, when an intake valve 18 is opened. The air-fuel mixture is burned by spark discharge of an ignition device 26 in the combustion chamber 24, and the energy generated by the combustion is converted into rotational energy of a crankshaft 28 via the piston 22. The burned air-fuel mixture is discharged to an exhaust passage 32 as exhaust gas when an exhaust valve 30 is opened. A three-way catalyst 34 is provided in the exhaust passage 32, and a gasoline particulate filter (GPF 36) is provided in a section downstream of the three-way catalyst 34 in the exhaust passage 32.

The intake passage 12 and a section of the exhaust passage 32 that is upstream of the three-way catalyst 34 are connected to each other by an EGR passage 38. The EGR passage 38 is provided with an EGR valve 40, which adjusts the cross-sectional flow area of the EGR passage 38. The EGR valve is driven by a step motor.

The internal combustion engine 10 is controlled by a controller 50. Specifically, the controller 50 operates operated portions of the engine 10, such as the throttle valve 14, the fuel injection valve 16, the ignition device 26, and the EGR valve 40, thereby controlling controlled amounts of the engine 10 (for example, the torque and the exhaust components). When controlling the controlled amounts, the controller 50 refers to the pressure on the upstream side of the GPF 36 detected by an upstream-side pressure sensor 60 (upstream-side pressure Pu), the pressure on the downstream side of the GPF 36 detected by a downstream-side pressure sensor 62 (downstream-side pressure Pd), and an output signal Scr of a crank angle sensor 64. Further, the controller 50 refers to an intake air amount Ga detected by an air flowmeter 66, the temperature of the coolant of the internal combustion engine 10 (coolant temperature THW) detected by a coolant temperature sensor 68, and an output signal Sn of a knocking sensor 70. The controller 50 includes a CPU 52, a ROM 54, and a nonvolatile memory 56, which can be electrically rewritten and executes control of the above-described controlled amounts by executing programs stored in the ROM 54 using the CPU 52.

Figure 2:
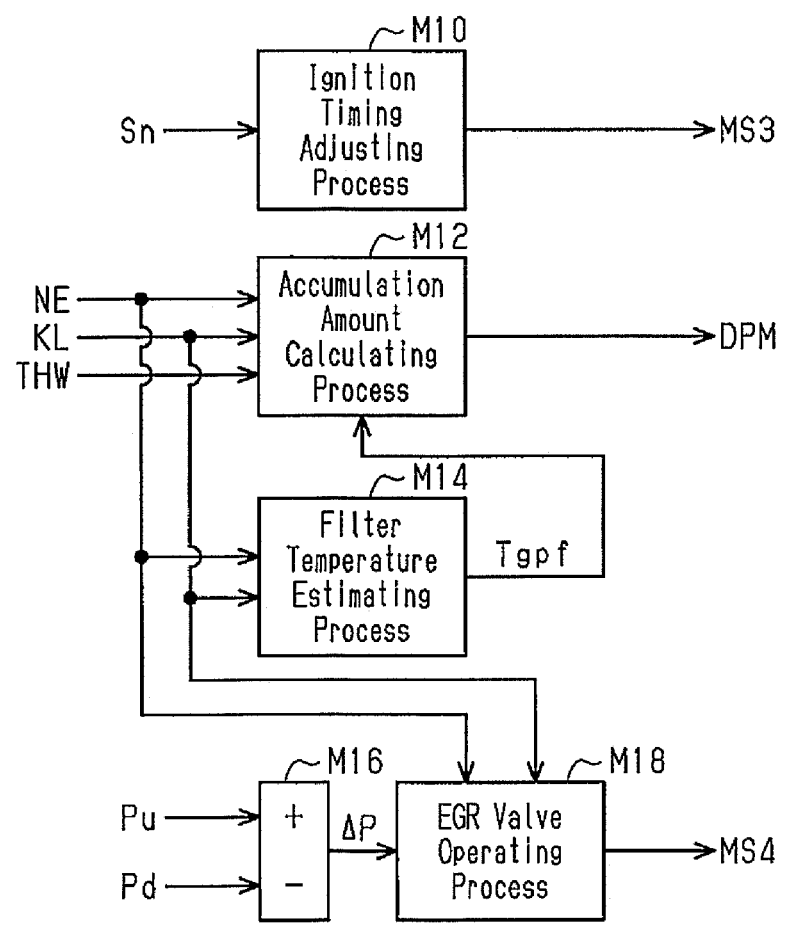
FIG. 2 is a block diagram showing part of processes executed by the controller of FIG. 1.

FIG. 2 shows part of the processes executed by controller 50. The processes shown in FIG. 2 are implemented by the CPU 52 executing programs stored in the ROM 54.

An ignition timing adjusting process M10 outputs an operation signal MS3 to the ignition device 26, thereby adjusting the ignition timing of the ignition device 26. Specifically, the ignition timing adjusting process M10 basically sets the ignition timing to the minimum advance for the best torque (MBT), but retards the ignition timing in relation to the MBT when determining that knocking has occurred based on the output signal Sn of the knocking sensor 70.

An accumulation amount calculating process M12 calculates the amount of particulate matter trapped by the GPF 36 (PM accumulation amount DPM) based on an rotational speed NE, a load factor KL, and the coolant temperature THW. The rotational speed NE is calculated from the output signal Scr of the crank angle sensor 64 by the CPU 52. The load factor KL is an amount indicating the amount of air filling the combustion chamber 24 and is the ratio of the inflow air amount per combustion cycle in one cylinder to a reference inflow air amount. In the present embodiment, the reference inflow air amount is set to the inflow air amount per combustion cycle of one cylinder when the opening degree of the throttle valve 14 is maximized. The reference inflow air amount may be variably set in accordance with the rotational speed NE.

More specifically, the accumulation amount calculating process M12 calculates an increase amount ΔDPM of the PM accumulation amount DPM per unit period based on the rotational speed NE, the load factor KL, and the coolant temperature THW, and calculates the PM accumulation amount DPM by accumulating the increase amount ΔDPM. This is implemented, for example, by storing map data having the rotational speed NE, the load factor KL, and the coolant temperature THW as input variables and the increase amount ΔDPM as an output variable in the ROM 54 and causing the CPU 52 to perform map calculation to obtain the increase amount ΔDPM. The map data refers to a data set of discrete values of the input variable and values of the output variable each corresponding to a value of the input variable. When the value of an input variable matches any of the values of the input variable on the map data, the map calculation simply needs to use the value of the corresponding output variable on the map data as the calculation result. Also, when the value of the input variable does not match any of the values of the input variable on the map data, the map calculation simply needs to use a value obtained by interpolation of multiple values of the output variable included in the map data set as the calculation result.

If a filter temperature Tgpf is higher than or equal to a predetermined temperature (for example, a temperature no lower than 550° C.) during the execution of a fuel cutoff process, it is assumed that the particulate matter trapped by the GPF 36 is burned and lost. In this case, the accumulation amount calculating process M12 reduces the PM accumulation amount DPM at predetermined intervals. The PM accumulation amount DPM is stored in the nonvolatile memory 56, and the accumulation amount calculating process M12 updates the PM accumulation amount DPM stored in the nonvolatile memory 56 with the PM accumulation amount DPM calculated each time.

A filter temperature estimating process M14 calculates the filter temperature Tgpf based on the rotational speed NE and load factor KL. More specifically, map data that has the rotational speed NE and the load factor KL as input variables and a steady temperature of the GPF 36 as an output variable is stored in the ROM 54. The CPU 52 performs map calculation to obtain a steady temperature and causes the filter temperature Tgpf to converge to the steady temperature. The process of convergence to the steady temperature simply needs to be, for example, a process of setting a new filter temperature Tgpf to the exponential moving average value of the steady temperature and the filter temperature Tgpf.

A differential pressure calculating process M16 calculates a differential pressure ΔP by subtracting the downstream-side pressure Pd from the upstream-side pressure Pu.

An EGR valve operating process M18 outputs an operation signal MS4 to the EGR valve 40 to adjust the opening degree of the EGR valve 40 based on the rotational speed NE and the load factor KL, thereby controlling the EGR rate to be a target EGR rate. The EGR rate is a value obtained by dividing the flow rate of exhaust gas flowing into the intake passage 12 from the exhaust passage 32 via the EGR passage 38 by the intake air amount Ga.

Figure 3:
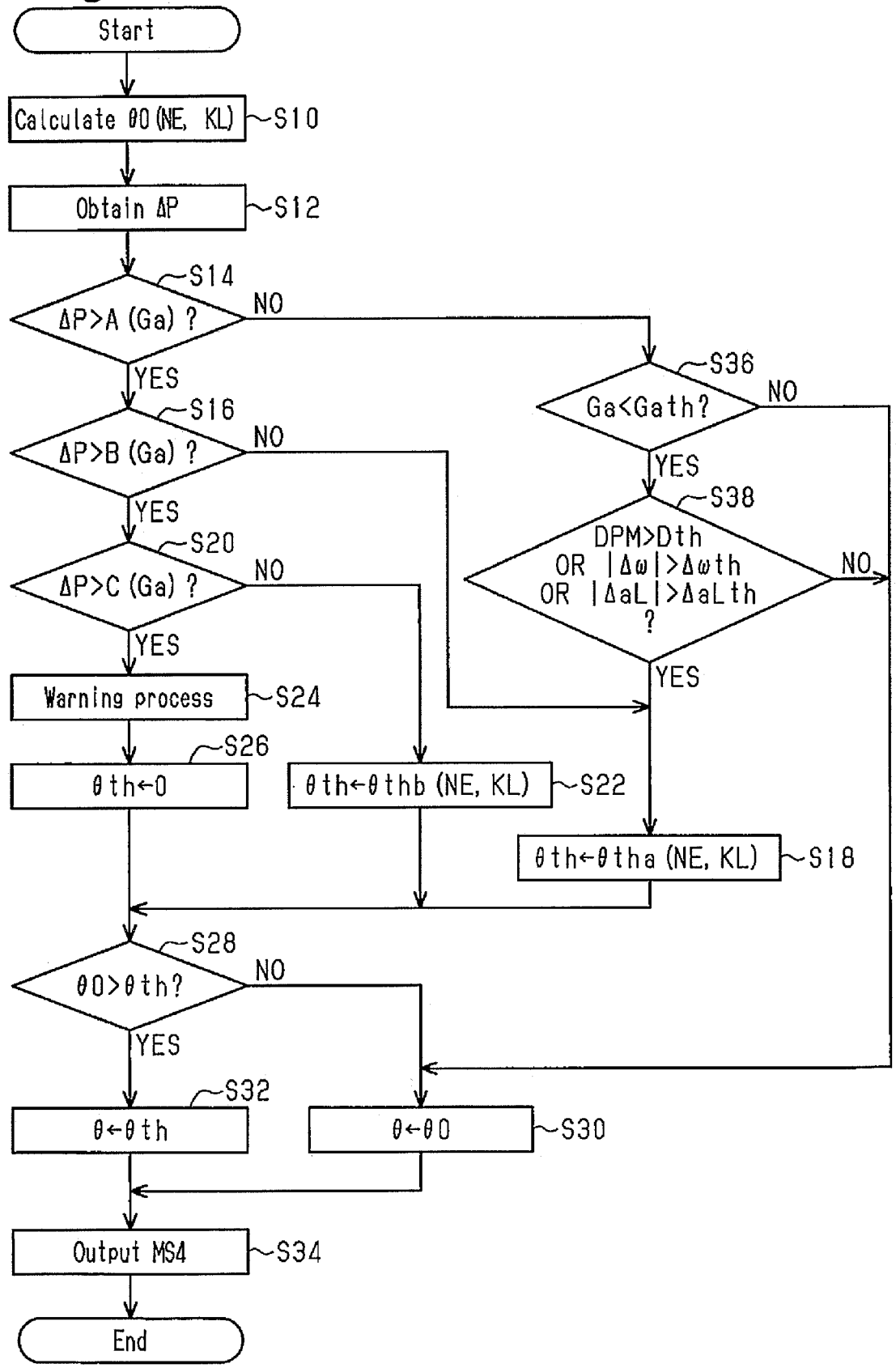
FIG. 3 is a flowchart showing a procedure of an EGR valve operating process executed by the controller of FIG. 1.

FIG. 3 shows the procedure of the EGR valve operating process M18. The process shown in FIG. 3 is executed by the CPU 52 repeatedly executing programs stored in the ROM 54 at a predetermined interval. In the following description, the number of each step is represented by the letter S followed by a numeral.

In the series of processes shown in FIG. 3, the CPU 52 first calculates a base opening degree θ0 based on the operating point of the internal combustion engine 10 (S10). The base opening degree θ0 is an operation amount for adjusting the EGR rate to the target EGR rate through an open-loop control. That is, the present embodiment has neither a sensor for detecting the flow rate of exhaust gas in the EGR passage 38 nor a sensor for detecting the differential pressure between the upstream side and the downstream side of the EGR valve 40, and thus the EGR rate cannot be detected. For this reason, the present embodiment adjusts the EGR rate through an open-loop control. More specifically, map data having the rotational speed NE and the load factor KL, which define the operating point of the engine 10, as input variables and the base opening degree θ0 as an output variable is stored in the ROM 54, and the CPU 52 performs map calculation to obtain the base opening degree θ0. The operating point is a parameter for obtaining the pressure in the intake passage 12. Further, the operating point is a parameter for obtaining the upstream-side pressure Pu when the PM accumulation amount DPM is an assumed value. In the present embodiment, on the assumption that the PM accumulation amount DPM is smaller than or equal to a predetermined amount, the differential pressure between the upstream side and the downstream side of the EGR valve 40 is obtained using the operating point, and the base opening degree θ0, which is an appropriate value for controlling the EGR rate to the target EGR rate, is set. In the present embodiment, the target EGR rate is variably set in accordance with the operating point of the internal combustion engine 10, and the base opening degree θ0 is an operation amount for controlling the EGR rate to the target EGR rate that corresponds to the operating point.

Specifically, map data having the rotational speed NE and the load factor KL as input variables and the base opening degree θ0 as an output variable is stored in the ROM 54, and the CPU 52 performs map calculation to obtain the base opening degree θ0.

Next, the CPU 52 obtains the differential pressure ΔP (S12). Then, the CPU 52 determines whether the differential pressure ΔP is greater than a first-stage determination value A (S14). This process is designed to determine whether the opening degree θ should be limited to a small value because the PM accumulation amount DPM is unexpectedly great for the setting of the base opening degree θ0. That is, in the present embodiment, the base opening degree θ0 is a value that is set on the assumption that the PM accumulation amount DPM is smaller than or equal to a predetermined amount. When the PM accumulation amount DPM increases, the differential pressure ΔP increases as compared to a case in which the PM accumulation amount DPM is small. When the differential pressure ΔP is great, the upstream-side pressure Pu is high. Thus, the differential pressure between the upstream side and the downstream side of the EGR valve 40 is greater than the value assumed in the setting of the base opening degree θ0. Therefore, if the opening degree of the EGR valve 40 is adjusted to the base opening degree θ0, a great amount of exhaust gas may flow into the intake passage 12 from the EGR passage 38 beyond the scope of the assumption.

Figure 4:
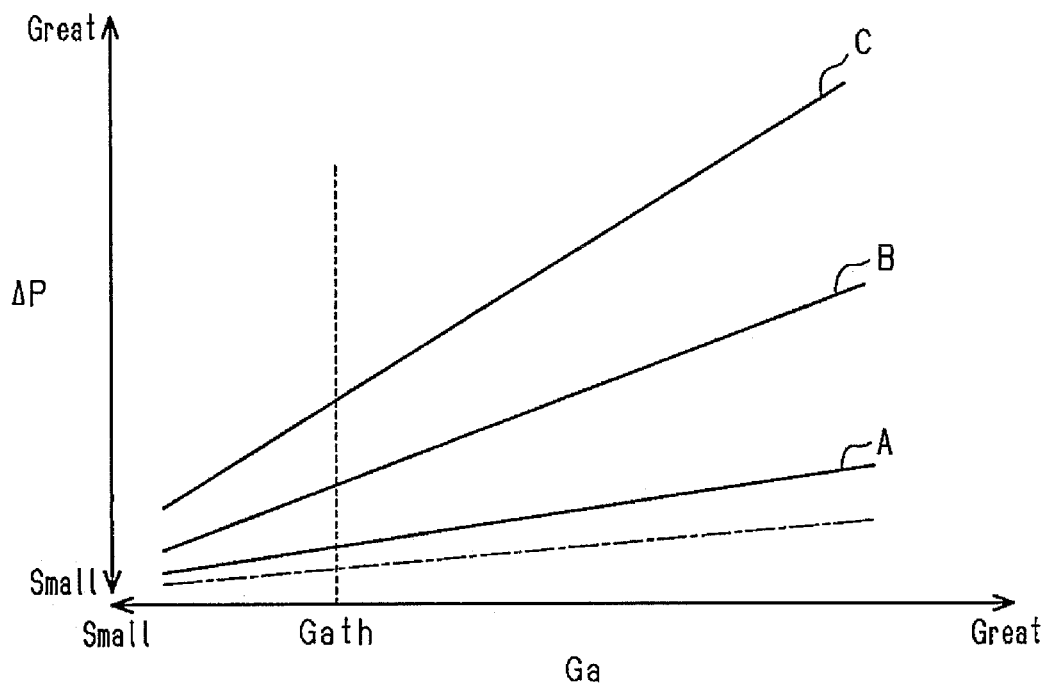
FIG. 4 is a diagram showing the tendency of the determination values used in the EGR valve operating process of FIG. 3.

Specifically, as shown in FIG. 4, the CPU 52 sets the first-stage determination value A to a greater value when the intake air amount Ga is great than when the intake air amount Ga is small. This setting is employed in view of the fact that even if the PM accumulation amount DPM is the same, the differential pressure ΔP becomes greater when the intake air amount Ga is great than when the intake air amount Ga is small. This is implemented by storing map data having the intake air amount Ga as an input variable and the first-stage determination value A as an output variable in the ROM 54 and causing the CPU 52 to perform a map calculation to obtain the first-stage determination value A.

Referring back to FIG. 3, when determining that the differential pressure ΔP is greater than the first-stage determination value A (S14: YES), the CPU 52 determines whether the differential pressure ΔP is greater than a second-stage determination value B (S16). The second-stage determination value B is greater than the first-stage determination value A. As shown in FIG. 4, the CPU 52 sets the second-stage determination value B to a greater value when the intake air amount Ga is greater than when the intake air amount Ga is small. The process of variably setting the second-stage determination value B is implemented by storing map data having the intake air amount Ga as an input variable and the second-stage determination value B as an output variable in the ROM 54 and causing the CPU 52 to perform a map calculation to obtain the second-stage determination value B.

When determining that the differential pressure ΔP is smaller than or equal to the second-stage determination value B (S16: NO), the CPU 52 substitutes a first-stage guard value θtha for an upper limit guard value θth of the opening degree θ of the EGR valve 40 (S18). Specifically, the CPU 52 variably sets the first-stage guard value θtha in accordance with the rotational speed NE and load factor KL. This is implemented by storing map data having the rotational speed NE and the load factor KL as input variables and the first-stage guard value θtha as an output variable in the ROM 54 and causing the CPU 52 to perform a map calculation to obtain the first-stage guard value θtha.

Figure 5:
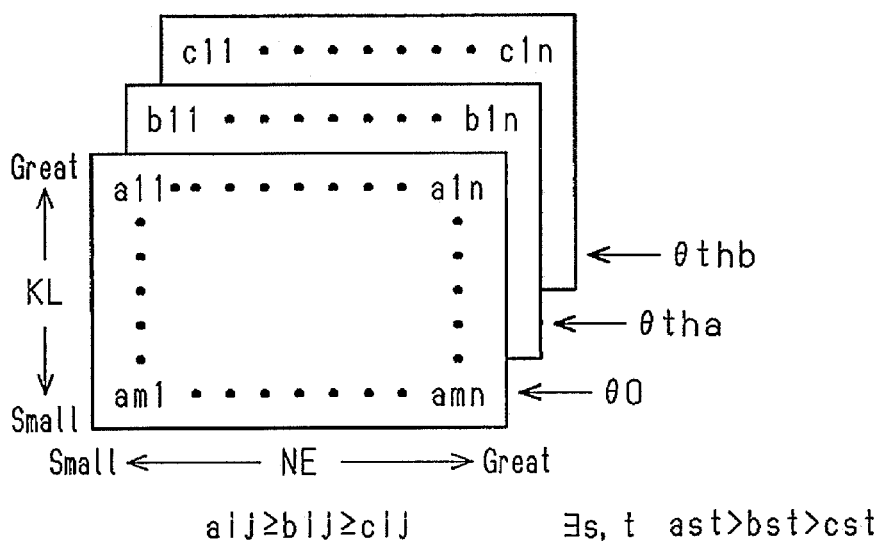
FIG. 5 is a diagram showing map data that is used to set the base opening degree and the guard value used in the EGR valve operating process of FIG. 3.

In FIG. 5, the output variable aij (i=1 to m, j=1 to n) of the map data for the base opening degree θ0 is contrasted with the output variable bij of the map data for the first-stage guard value θtha. As shown in FIG. 5, the variable i designates the load factor KL, and the variable j designates the rotational speed NE.

As shown in FIG. 5, the output variable bij of the map data for the first-stage guard value θtha is set to be smaller than or equal to the output variable aij of the map data for the base opening degree θ0. In particular, depending on the operating point of the internal combustion engine 10, the output variable bij is set to a value smaller than the output variable aij of the map data for the base opening degree θ0. The setting of the present embodiment allows the first-stage guard value θtha and the base opening degree θ0 to be equal to each other because there are operating points at which the influence on the controllability of the EGR rate can be ignored even if the upstream-side pressure Pu becomes greater than assumed.

The second-stage determination value B is set to the upper limit value of the differential pressure ΔP at which the process of limiting the opening degree θ of the EGR valve 40 with the first-stage guard value θtha is effective. In other words, the second-stage determination value B is set to the upper limit value of a range in which limiting of the opening degree θ of the EGR valve 40 with the first-stage guard value θtha does not excessively increase the flow rate of exhaust gas flowing into the intake passage 12 from the EGR passage 38.

Referring back to FIG. 3, when determining that the differential pressure ΔP is greater than the second-stage determination value B (S16: YES), the CPU 52 determines whether the differential pressure ΔP is greater than a third-stage determination value C (S20). The third-stage determination value C is set to a value greater than the second-stage determination value B. As shown in FIG. 4, the CPU 52 sets the third-stage determination value C to a greater value when the intake air amount Ga is great than when the intake air amount Ga is small. This process is implemented by storing map data having the intake air amount Ga as an input variable and the third-stage determination value C as an output variable in the ROM 54 and causing the CPU 52 to perform a map calculation to obtain the third-stage determination value C.

When determining that the differential pressure ΔP is smaller than or equal to the third-stage determination value C (S20: NO), the CPU 52 substitutes a second-stage guard value θthb for the upper limit guard value θth of the opening degree θ of the EGR valve 40 (S22). Specifically, the CPU 52 variably sets the second-stage guard value θthb in accordance with the rotational speed NE and load factor KL. This is implemented by storing map data having the rotational speed NE and the load factor KL as input variables and the second-stage guard value θthb as an output variable in the ROM 54 and causing the CPU 52 to perform a map calculation to obtain the second-stage guard value θthb.

As shown in FIG. 5, the output variable cij for the second-stage guard value θthb is set to be smaller than or equal to the output variable bij of the map data for the first-stage guard value θtha. In particular, depending on the operating point of the internal combustion engine 10, the output variable cij is set to a value smaller than the output variable bij of the map data for the first-stage guard value θtha.

The third-stage determination value C is set to the upper limit value of the differential pressure ΔP at which the process of limiting the opening degree θ of the EGR valve 40 with the second-stage guard value θthb is effective. In other words, the third-stage determination value C is set to the upper limit value of a range in which limiting of the opening degree θ of the EGR valve 40 with the second-stage guard value θthb does not excessively increase the flow rate of exhaust gas flowing into the intake passage 12 from the EGR passage 38.

Referring back to FIG. 3, when determining that the differential pressure ΔP is greater than the third-stage determination value C (S20: YES), the CPU 52 executes a process of operating a warning lamp 72 shown in FIG. 1 to inform the user of an anomaly and urging the user to order repair service at a repair shop (warning process, S24). The CPU 52 then substitutes 0 for the upper limit guard value θth (S26).

When any of the processes of S18, S22, and S26 is completed, the CPU 52 determines whether the base opening degree θ0 is greater than the upper limit guard value θth (S28). When determining that the base opening degree value θ0 is smaller than or equal to the upper limit guard value θth (S28: NO), the CPU 52 substitutes the base opening degree θ0 for the opening degree θ of the EGR valve 40 (S30). In contrast, when determining that the base opening degree value θ0 is greater than the upper limit guard value θth (S28: YES), the CPU 52 substitutes the upper limit guard value θth for the opening degree θ (S32).

When the process of S30 or S32 is completed, the CPU 52 outputs an operation signal MS4 to the EGR valve 40 to control the actual opening degree of the EGR valve 40 to the opening degree θ (S34). The operation signal MS4 is a signal for controlling the rotation amount (the number of steps) of the step motor that drives the EGR valve 40 to an adequate rotation amount.

In contrast, when determining that the differential pressure ΔP is smaller than or equal to the first-stage determination value A (S14: NO), the CPU 52 determines whether the intake air amount Ga is smaller than a predetermined amount Gath (S36). The predetermined amount Gath is set to the lower limit value of a range in which it is possible to accurately determine that the PM accumulation amount DPM has increased based on the differential pressure ΔP. The value of the differential pressure ΔP in the case in which the PM accumulation amount is zero, which is indicated by the long dashed short dashed line in FIG. 4. The difference between the differential pressure ΔP in this case and the first-stage determination value A decreases as the intake air amount Ga decreases. Therefore, when the intake air amount Ga is excessively small, it is impossible to accurately determine whether the PM accumulation amount DPM has increased to some extent.

When determining that the intake air amount Ga is smaller than the predetermined amount Gath (S36: YES), the CPU 52 determines whether the logical disjunction of the following conditions (A), (B), and (C) is true or false (S38).

The condition (A) is that the PM accumulation amount DPM is greater than a predetermined amount Dth. The predetermined amount Dth is set to the upper limit value of a range in which the EGR rate can be accurately controlled with the base opening degree θ0 that is adjusted on the assumption that the PM accumulation amount DPM is small.

The condition (B) is that the absolute value of a rotation fluctuation amount Δω of the crankshaft 28 is greater than a predetermined amount Δωth. The rotation fluctuation amount Δω is a parameter for quantifying the degree of deterioration of combustion and is obtained based on the rotational speeds (instantaneous rotational speeds ω) at a predetermined angular interval including only one compression top dead center of two cylinders in which the compression top dead center occurs successively. Specifically, the rotation fluctuation amount Δω obtained by subtracting the rotational speed of one of the two cylinders in which the compression top dead center occurs later from the rotational speed of the other cylinder, in which the compression top dead center occurs earlier. If the combustion deteriorates so that the torque is decreased, the rotation fluctuation amount Δω takes a negative value having a great absolute value. When the amount of exhaust gas flowing into the intake passage 12 from the EGR passage 38 becomes great for the opening degree θ of the EGR valve 40, the concentration of oxygen in the fluid filling the combustion chamber 24 decreases. This is likely to cause the combustion to deteriorate, increasing the absolute value of the rotation fluctuation amount Δω. The predetermined amount Δωth is set to the upper limit value of a range in which the EGR rate can be accurately controlled with the base opening degree θ0 that is adjusted on the assumption that the PM accumulation amount DPM is small.

The condition (C) is that, in terms of the retardation amount aL from the MBT of the ignition timing, the absolute value of the difference ΔaL between the value when the opening degree θ of the EGR valve 40 is zero and the value when the opening degree θ of the EGR valve 40 is greater than zero is greater than a threshold value ΔaLth. This setting is employed in view of the fact that knocking is unlikely to occur when the flow rate of exhaust gas flowing into the intake passage 12 from the EGR passage 38 is excessive, and therefore the ignition timing is advanced by the knocking control. The threshold value ΔaLth is set to the upper limit value of a range in which the EGR rate can be accurately controlled with the base opening degree θ0 that is adjusted on the assumption that the PM accumulation amount DPM is small.

When determining that the logical disjunction of the condition (A), the condition (B), and the condition (C) is true (S38: YES), the CPU 52 proceeds to the process of S18. When determining that the logical disjunction is false (S38: NO) or when the determination is negative in the process of S36, the CPU 52 proceeds to the process of S30.

When the process of step S34 is completed, the CPU 52 temporarily ends the series of processes shown in FIG. 3.

The operation of the present embodiment will now be described.

Figure 6A:
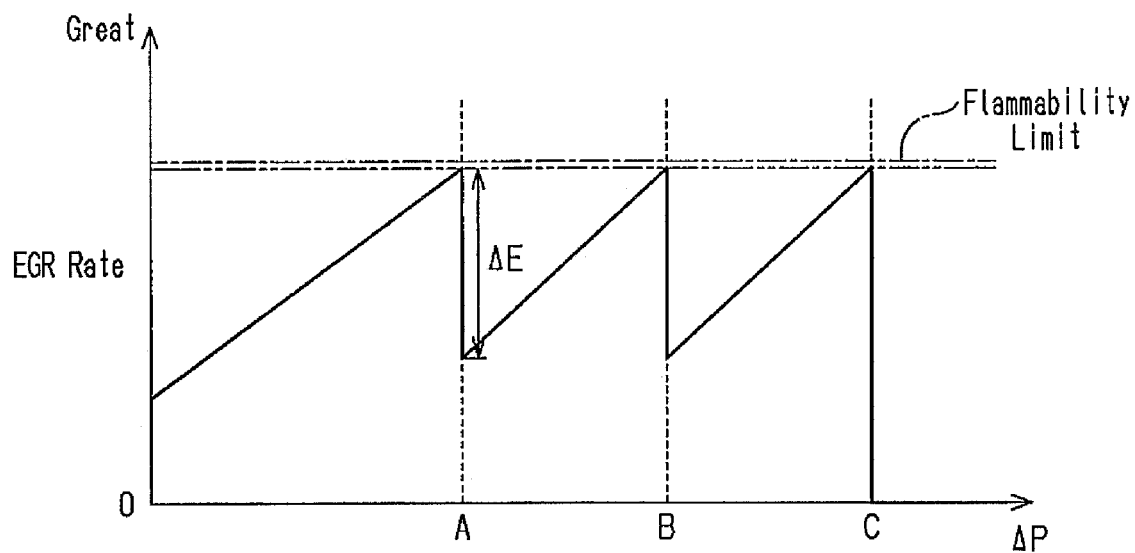
FIGS. 6A and 6B are timing diagrams showing effects of the EGR valve operating process of FIG. 3.
Figure 6B:
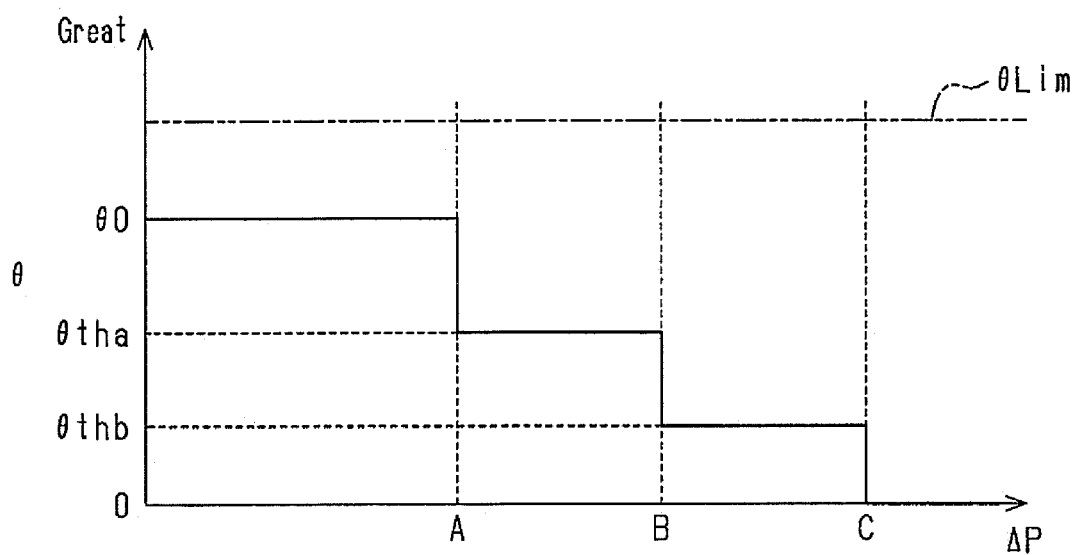

FIGS. 6A and 6B show the setting of the opening degree θ of the EGR valve 40 and changes in the EGR rate when the differential pressure ΔP at the same operating point gradually increases as the PM accumulation amount DPM gradually increases. In FIG. 6A, the long dashed double-short dashed line represents the EGR rate when the GPF 36 is not provided. The opening degree θLim represented by the long dashed double-short dashed line in FIG. 6B represents the opening degree θ when the GPF 36 is not provided. The pressure on the upstream side of the EGR valve 40 is not as increased in the case in which the GPF 36 is not provided as in the case in which the GPF 36 is provided. The opening degree θLim is thus set to a constant value, and the corresponding EGR rate is constant and represented by a straight line.

As shown in FIG. 6A, as the differential pressure ΔP increases toward the first-stage determination value A, the EGR rate increases and the oxygen concentration in the fluid in the combustion chamber 24 decreases. Accordingly, the EGR rate approaches the flammability limit. When the differential pressure ΔP reaches the first-stage determination value A, the EGR rate becomes the value in the case in which the GPF 36 is not provided, which is indicated by the long dashed double-short dashed line in FIG. 6A. When the differential pressure ΔP exceeds the first-stage determination value A, the CPU 52 limits the opening degree θ to the first-stage guard value θtha as shown in FIG. 6B. This lowers the EGR rate, so that the concentration of oxygen in the fluid in the combustion chamber 24 is prevented from decreasing and thus the EGR rate is prevented from exceeding the flammability limit.

Immediately after the differential pressure ΔP exceeds the first-stage determination value A and the opening degree θ is limited to the first-stage guard value θtha, the EGR rate is limited to a value that is smaller than the value in the case in which the GPF 36 is not provided by a predetermined amount ΔE, which increases the fuel consumption amount. The first-stage guard value θtha is set so as to minimize the increase in the fuel consumption amount at this time. At the operating point shown in FIGS. 6A and 6B, the target EGR rate discussed in the description of the setting of the base opening degree θ0 has a value within a region from a value of the EGR rate in the case in which the GPF 36 is not provided to the value obtained by subtracting the predetermined amount ΔE from the first value.

As the differential pressure ΔP increases due to a further increase in the PM accumulation amount DPM, the EGR rate approaches the flammability limit again. When the PM accumulation amount DPM further increases so that the differential pressure ΔP further increases, the EGR rate reaches a value in the case in which the GPF 36 is not provided. The differential pressure ΔP at this time is the second-stage determination value B. When determining that the differential pressure ΔP will exceed the second-stage determination value B, the CPU 52 limits the opening degree θ of the EGR valve 40 to the second-stage guard value θthb. This lowers the EGR rate, so that the concentration of oxygen in the fluid in the combustion chamber 24 is prevented from decreasing and thus the EGR rate is prevented from exceeding the flammability limit. In the present embodiment, the second-stage guard value θthb is set to a value at which the EGR rate immediately after the start of limitation with the second-stage guard value θthb does not become excessively small.

When the PM accumulation amount DPM further increases so that the differential pressure ΔP further increases, the EGR rate reaches a value in the case in which the GPF 36 is not provided. The differential pressure ΔP at this time is the third-stage determination value C. When determining that the differential pressure ΔP will exceed the third-stage determination value C, the CPU 52 limits the opening degree θ of the EGR valve 40 to zero.

Thus, the present embodiment prevents the EGR rate from excessively increasing and reaching the flammability limit while suppressing excessive increase in the fuel consumption amount. In addition, if the EGR rate becomes excessively high, there are disadvantages other than the EGR rate reaching the flammability limit depending on the region of the operating point of the internal combustion engine 10 as shown in FIG. 7, and the present embodiment prevents such disadvantages.

Figure 7:
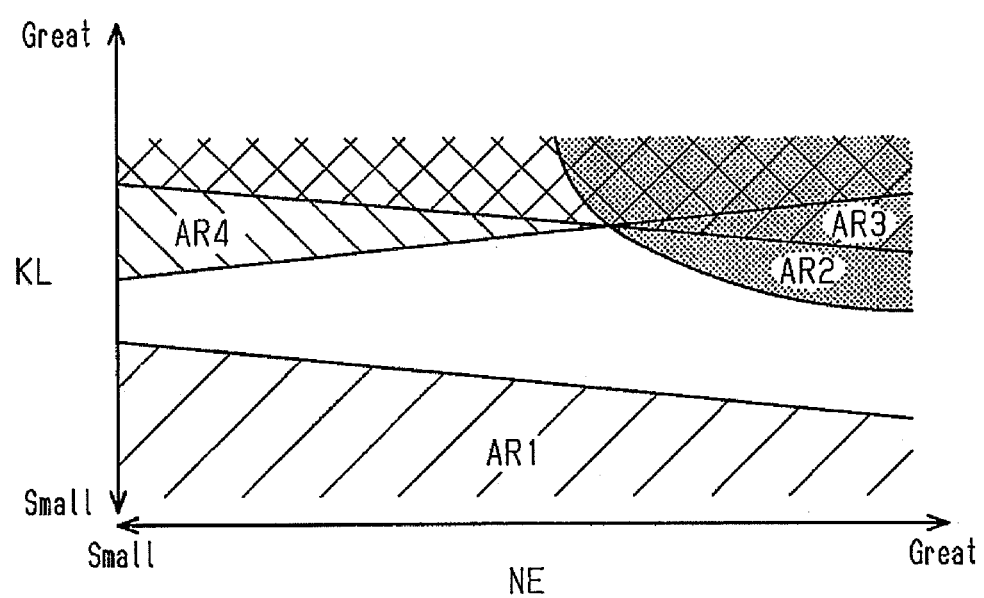
FIG. 7 is a diagram showing a problem caused by the EGR rate being higher than assumed.

The region AR1 shown in FIG. 7 is a region where the torque fluctuation tends to be great due to the EGR rate reaching the flammability limit. The region AR2, which is a dotted area, is a region in which if the amount of heat received by the intake passage 12 is increased and the intake passage 12 is made of a material vulnerable to heat such as a plastic, deterioration thereof may be promoted. The region AR3 with a hatch pattern of positively sloped lines is a region in which the controllability of the knocking control may be reduced. That is, when the EGR rate increases, knocking is less likely to occur easily. Accordingly, the ignition timing tends to be advanced. The amount by which the ignition timing is advanced due to an increase in the EGR rate tends to vary depending on the operating point. Thus, when a retardation amount that does not cause knocking is learned, the learned value may not become an adequate value depending on the operating point, causing knocking. The region AR4 with a hatch pattern of negatively sloped lines is a region in which the pressure in a section of the intake passage 12 on the downstream side of the throttle valve 14 increases due to an increase in the EGR rate, and the increase in the intake air amount when the opening degree of the throttle valve 14 is increased is slowed.

<Correspondence>

The correspondence between the items in the above-described embodiments and the items described in the above SUMMARY is as follows. Below, the correspondence is shown for each of the numbers in the examples described in the above SUMMARY.

[1] In Example 1, "filter" corresponds to the GPF 36, and "limiting process" corresponds to the processes of S18, S22, S26, S28, and S32.

[2] In Example 2, "EGR control process" corresponds to the processes of S10, S30, and S34.

[3] The contents of the process of Example 3 correspond to the processes of S14, S16, and S20.

[4] In Example 4, "threshold value" corresponds to the first-stage determination value A or the second-stage determination value B, and "limited opening degree" corresponds to the first-stage guard value θtha or the second-stage guard value θthb. "At least part of a region of the operating point" corresponds to the operating point specified by the variables s and t in FIG. 5 and the operating point assumed in FIGS. 6A and 6B.

[5] In Example 5, "first threshold value" corresponds to the first-stage determination value A, "first limited opening degree" corresponds to the first-stage guard value θtha, "second threshold value" corresponds to the second-stage determination value B, and "second limited opening degree" corresponds to the second-stage guard value θthb.

[6] In Example 6, "predetermined value" corresponds to the third-stage determination value C.

[7] In Example 7, "threshold value" corresponds to the first-stage determination value A, and "limited opening degree" corresponds to the first-stage guard value θtha.

Other Embodiments

At least one feature of the above-illustrated embodiment may be modified as follows.

Regarding Differential Pressure as Input of Limiting Process

In the above-described embodiment, the limiting process of the opening degree of the EGR valve 40 is executed by using the differential pressure ΔP obtained by subtracting the downstream-side pressure Pd from the upstream-side pressure Pu. However, the configuration is not limited to this. For example, the downstream-side pressure Pd may be assumed to be constant, and the upstream-side pressure Pu may be assumed to be the differential pressure ΔP. In this case, each of the first-stage determination value A, the second-stage determination value B, and the third-stage determination value C is obtained by adding the downstream-side pressure Pd, which is assumed to be constant, to the corresponding value in the above-described embodiment.

Regarding Input of Limiting Process

The input of the processes of S14, S16, and S20 is not limited to the differential pressure ΔP. For example, the input of the process of S14, S16, and S20 may be the PM accumulation amount DPM, and the process of each of S14, S16, and S20 may be a process in which the PM accumulation amount is compared with each of the first-stage determination value A, the second-stage determination value B, and the third-stage determination value C.

Regarding Limiting Process

In the above-described embodiment, the opening degree of the EGR valve 40 is limited by substituting a small value for the upper limit guard value θth of the base opening degree θ0, but the configuration is not limited to this. For example, map data having the operating point as an input variable and the opening degree θ as an output variable may be stored in the ROM 54 for each of a case in which the differential pressure ΔP is greater than the second-stage determination value B and smaller than or equal to the third-stage determination value C and a case in which the differential pressure ΔP is greater than the first-stage determination value A and smaller than or equal to the second-stage determination value B, and the CPU 52 is caused to perform a map calculation to obtain the opening degree θ.

In the above-described configuration, the opening degree of the EGR valve 40 is limited in two steps depending on whether the differential pressure ΔP is greater than each of the first-stage determination value A, the second-stage determination value B, and the third-stage determination value C. However, the configuration is not limited to this. For example, the opening degree of the EGR valve 40 may be limited in one stage. In this case, the process with the greater degree of limitation may be a process of limiting the opening degree of the EGR valve 40 to zero. Also, for example, instead of setting the limitation to one step, a process may be executed in which the opening degree of the EGR valve 40 is limited to zero when the differential pressure ΔP is greater than a predetermined value.

Further, the opening degree of the EGR valve 40 may be limited by three or more stages in accordance with the differential pressure ΔP. In this case, since the degree of drop of the EGR rate can be made smaller than that shown in FIG. 6A, the increase in the fuel consumption amount can be suppressed.

In the above-described embodiment, when the intake air amount Ga is smaller than the predetermined amount Gath, whether the opening degree of the EGR valve 40 should be limited is determined binarily depending on whether the logical disjunction of the conditions (A), (B), and (C) is true or false. However, the configuration is not limited to this. For example, the degree of limitation of the opening degree of the EGR valve 40 may be increased in a stepwise manner by more than one stage in accordance with the absolute values of the PM accumulation amount DPM and the rotation fluctuation amount Δω or the magnitude of the absolute value of the difference ΔaL.

Regarding Execution Condition of Limitation when Intake Air Amount Ga is smaller than Predetermined Amount Gath In the above-described embodiment, when the intake air amount Ga is smaller than the predetermined amount Gath, the opening degree of the EGR valve 40 is limited when the logical disjunction of the conditions (A), (B), and (C) is true. However, the configuration is not limited to this. For example, the process of S38 may be a process of determining only whether the condition (A) is satisfied, a process of determining only whether the condition (B) is satisfied, or a process of determining only whether the condition (C) is satisfied. Further, the process of S38 may be a process of determining whether the logical disjunction of the conditions (A) and the condition (B) is true or false, a process of determining whether the logical disjunction of the conditions (A) and the condition (C) is true or false, or a process of determining whether the logical disjunction of the conditions (B) and the condition (C) is true or false.

Regarding EGR Control Process

In the above-described embodiment, the operating point of the internal combustion engine 10 is defined by the rotational speed NE and load factor KL, and the base opening degree θ0 is variably set based on the operating point. However, the operating point for defining the base opening degree θ0 is not limited to the one that is defined by the rotational speed NE and the load factor KL. For example, in place of the load factor KL, the injection amount or the accelerator operation amount may be used as a parameter indicating the load.

However, for the process of limiting the opening degree of the EGR valve 40 when the PM accumulation amount DPM is great, the EGR control process of variably setting the opening degree of the EGR valve 40 as the operation amount in accordance with the operating point of the engine 10 is not indispensable. For example, when there is a process of calculating the flow rate of exhaust gas flowing into the intake passage 12 from the EGR passage 38 or a process of obtaining the detection value of the flow rate, the accuracy of the calculated value or the detection value is not high in some cases. In such a case, it is effective to limit the opening degree of the EGR valve 40 when the PM accumulation amount DPM is great.

Regarding EGR Valve

In the above-described embodiment, the EGR valve 40 is a valve driven by a step motor, however, the EGR valve 40 may be a solenoid valve, for example. In this case, the opening degree can be controlled by determining the amount of supplied current in accordance with the opening degree in advance.

Regarding PM Accumulation Amount

The method of estimating the PM accumulation amount DPM is not limited to that discussed in the above-described embodiment. For example, when the intake air amount Ga is greater than or equal to the predetermined amount Gath, the PM accumulation amount DPM may be estimated based on the differential pressure ΔP and the intake air amount Ga. Specifically, it is only necessary to set the PM accumulation amount DPM to a greater value when the differential pressure ΔP is great than when the differential pressure ΔP is small, and to set the PM accumulation amount DPM to a smaller value when the intake air amount Ga is great than when the intake air amount Ga is small. More specifically, it is only necessary to store map data having the differential pressure ΔP and the intake air amount Ga as input variables and the PM accumulation amount DPM as an output variable in the ROM 54 and to cause the CPU 52 to perform a map calculation to obtain the PM accumulation amount DPM. In this case, when the intake air amount Ga shifts from a value greater than or equal to the predetermined amount Gath to a value smaller than the predetermined amount Gath, the initial value of the PM accumulation amount DPM after the shifting only needs to be a PM accumulation amount DPM that is estimated based on the differential pressure ΔP.

Regarding Controller

The controller is not limited to a device that includes the CPU 52 and the ROM 54 and executes software processing.

For example, a dedicated hardware circuit (such as an ASIC) may be provided that executes at least part of the software processes executed in the above-described embodiment. That is, the controller may be modified as long as it has any one of the following configurations (a) to (c). (a) A configuration including a processor that executes all of the above-described processes according to programs and a program storage device such as a ROM that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing circuits each including a processor and a program storage device and a plurality of dedicated hardware circuits may be provided. That is, the above processes may be executed in any manner as long as the processes are executed by processing circuitry that includes at least one of a set of one or more software processing circuits and a set of one or more dedicated hardware circuits.

Regarding Internal Combustion Engine

It is not essential to connect the EGR passage 38 to the upstream side of the three-way catalyst 34, and it may be connected between the three-way catalyst 34 and the GPF 36. The fuel injection valve is not limited to a port injection valve that injects fuel to the intake passage 12, but may be a direct injection valve that injects fuel into the combustion chamber 24.

The invention claimed is:

1. A controller for an internal combustion engine, wherein the internal combustion engine includes a filter, which is configured to trap particulate matter in exhaust gas, an EGR passage, which connects a section of an exhaust passage that is upstream of the filter to an intake passage, and an EGR valve, which is configured to adjust a cross-sectional flow area of the EGR passage,
the controller comprising processing circuitry, which is configured to
execute an EGR control process of operating an opening degree of the EGR valve in accordance with an operating point of the internal combustion engine, thereby adjusting a flow rate of exhaust gas flowing into the intake passage from the EGR passage through an open-loop control, and
execute a limiting process of limiting the opening degree of the EGR valve such that the opening degree is decreased more in at least part of a region of the operating point when an amount of the particulate matter trapped by the filter is greater as compared to when the amount is smaller, thereby preventing the flow rate of exhaust gas flowing into the intake passage from the EGR passage from becoming greater than a predetermined amount.

2. The controller for an internal combustion engine according to claim 1, wherein the limiting process includes a process of limiting the opening degree of the EGR valve such that the opening degree is decreased more in the at least part of the region of the operating point when a differential pressure that is obtained by subtracting a pressure in a section of the exhaust passage that is downstream of the filter from a pressure in the section of the exhaust passage that is upstream of the filter is greater as compared to when the differential pressure is smaller.

3. The controller for an internal combustion engine according to claim 2, wherein the limiting process includes a process of limiting, when the differential pressure is greater than a threshold value, the opening degree of the EGR valve to a limited opening degree, which is greater than zero and smaller than the opening degree in a case in which the differential pressure is smaller than or equal to the threshold value, in the at least part of the region of the operating point of the internal combustion engine.

4. The controller for an internal combustion engine according to claim 3, wherein
the limited opening degree is a first limited opening degree,
the threshold value is a first threshold value, and
the limiting process includes
a process of limiting the opening degree of the EGR valve to the first limited opening degree in the at least part of the region of the operating point when the differential pressure is greater than the first threshold value and smaller than or equal to a second threshold value, which is greater than the first threshold value, and
a process of limiting, when the differential pressure is greater than the second threshold value, the opening degree of the EGR valve to a second limited opening degree, which is greater than zero and smaller than the first limited opening degree, in the at least part of the region of the operating point.

5. The controller for an internal combustion engine according to claim 3, wherein the limiting process includes a process of limiting the opening degree of the EGR valve to zero when the differential pressure is greater than a predetermined value that is greater than the threshold value.

6. The controller for an internal combustion engine according to claim 3, wherein the limiting process includes a process of limiting, when an intake air amount is smaller than a predetermined amount and the differential pressure is smaller than the threshold value, the opening degree of the EGR valve to the limited opening degree in the at least part of the region of the operating point.

7. A control method for an internal combustion engine, wherein the internal combustion engine includes a filter, which is configured to trap particulate matter in exhaust gas, and an EGR passage, which connects a section of an exhaust passage that is upstream of the filter to an intake passage, the method comprising:
controlling an opening degree of an EGR valve, thereby adjusting a cross-sectional flow area of the EGR passage, wherein the opening degree of the EGR valve is operated in accordance with an operating point of the internal combustion engine, thereby adjusting a flow rate of exhaust gas flowing into the intake passage from the EGR passage through an open-loop control; and
limiting the opening degree of the EGR valve such that the opening degree is decreased more in at least part of a region of the operating point when an amount of the particulate matter trapped by the filter is greater as compared to when the amount is smaller, thereby preventing the flow rate of exhaust gas flowing into the intake passage from the EGR passage from becoming greater than a predetermined amount.

* * * * *